United States Patent [19]

Kim

[11] Patent Number: 5,584,056
[45] Date of Patent: Dec. 10, 1996

[54] DUAL-BANDWIDTH CELLULAR TELEPHONE SWITCHING APPARATUS

[75] Inventor: Jong-Han Kim, Seoul, Rep. of Korea

[73] Assignee: Hyundai Electronics Industrial Co., Ltd., Kyoungki-do, Rep. of Korea

[21] Appl. No.: 518,974

[22] Filed: Aug. 24, 1995

[30] Foreign Application Priority Data

Oct. 17, 1994 [KR] Rep. of Korea .................. 26549/1994

[51] Int. Cl.$^6$ ..................................................... H04B 1/38
[52] U.S. Cl. .......................... 455/89; 455/266; 455/200.1; 455/343
[58] Field of Search ................................ 455/76, 343, 77, 455/78, 84, 89, 133, 136, 188.1, 189.1, 190.1, 266, 338, 200.1

[56] References Cited

U.S. PATENT DOCUMENTS

| | | | |
|---|---|---|---|
| 4,903,335 | 2/1990 | Shimizu | 455/343 X |
| 4,972,455 | 11/1990 | Phillips et al. | |
| 4,987,317 | 1/1991 | Pournain et al. | 455/343 X |
| 5,023,939 | 5/1991 | Hori | 455/188.1 |
| 5,280,636 | 1/1994 | Kelley et al. | 455/190.1 X |
| 5,437,051 | 7/1995 | Oto | 455/189.1 X |
| 5,497,507 | 3/1996 | Komaki | 455/89 |

*Primary Examiner*—Curtis Kuntz
*Assistant Examiner*—Lisa M. Coward
*Attorney, Agent, or Firm*—Armstrong, Westerman, Hattori, McLeland & Naughton

[57] ABSTRACT

A dual-bandwidth cellular telephone switching apparatus comprising a signal receiver, the signal receiver including an antenna for receiving radio frequency signals on a field corresponding to frequency bands of at least two different cellular telephone systems, a duplexer for passing a desired frequency band component of output signals from the antenna, a low-noise amplifier for amplifying a feeble signal from the duplexer, a band pass filter for passing a desired frequency band component of an output signal from the low-noise amplifier, a synthesizer for detecting a channel being presently serviced and a mixer for mixing an output signal from the band pass filter with an output signal from the synthesizer to produce an intermediate frequency signal. The dual-bandwidth cellular telephone switching apparatus further comprises a switching section including first and second switching circuits. The first and second switching circuits selectively switch power to the two different cellular telephone systems under control of a central controller to selectively transfer an output signal from the mixer in the signal receiver thereto.

3 Claims, 2 Drawing Sheets

DUAL-BANDWIDTH CELLULAR TELEPHONE SWITCHING APPARATUS

BACKGROUND OF THE INVENTION

1. Field of the Invention

The present invention relates in general to dual-bandwidth cellular telephones, and more particularly to a dual-bandwidth cellular telephone switching apparatus for automatically switching power to two different cellular telephone systems to provide services on the cellular telephone systems.

2. Description of the Prior Art

Generally, two transceivers have been used to provide services on two different cellular telephone systems. Use of the two transceivers is both bulky and relatively expensive. In order to make up for such problem, it have been proposed to switch an intermediate frequency (referred to hereinafter as IF) section. Such an IF section switching method is a manual switching method for switching the IF section in response to user activation of a mechanical switch. However, the manual switching method is not suitable for use in cellular telephones and also requires user intervention and additional circuitry, increasing the cost and complexity thereof.

Another IF section switching method is an analog switching method which is used in most cellular telephones. One example of analog switching method is shown in U.S. Pat. No. 4,972,455. However, the analog switching method has a disadvantage in that it requires a relatively expensive frequency switch for passing a radio frequency (referred to hereinafter as RF) signal. A conventional analog switching apparatus using the above-mentioned analog switching method will hereinafter be described with reference to FIG. 1.

Referring to FIG. 1, there is shown a circuit diagram of a conventional dual-bandwidth cellular telephone switching apparatus. As shown in this drawing, the conventional dual-bandwidth cellular telephone switching apparatus comprises a signal receiver 100 and a switching circuit 200.

The signal receiver 100 includes an antenna 10 for receiving RF signals on a field corresponding to frequency bands of two different cellular telephone systems, a duplexer 11 for passing a desired frequency band component of output signals from the antenna 10, a low-noise amplifier 12 for amplifying a feeble signal from the duplexer 11, a band pass filter 13 for passing a desired frequency band component of an output signal from the low-noise amplifier 12, a synthesizer 14 for detecting a channel being presently serviced, and a mixer 15 for mixing an output signal from the band pass filter 13 with an output signal from the synthesizer 14 to produce an IF signal.

The switching circuit 200 includes a buffer 21 for buffering an output signal from the mixer 15 in the signal receiver 100, an analog switch 22 for selectively transferring an output signal from the buffer 21 to terminals A and B corresponding respectively to the two different cellular telephone systems in response to an A/B switching control signal s from a central controller 20, a first IF filter 23 for filtering an output signal from the terminal A if the terminal A is selected by the analog switch 22, a second IF filter 24 for filtering an output signal from the terminal B if the terminal B is selected by the analog switch 22, a first detector 25 for detecting an output signal from the first IF filter 23 to produce an audio signal and data, and a second detector 26 for detecting an output signal from the second IF filter 24 to produce an audio signal and data.

The operation of the conventional dual-bandwidth cellular telephone switching apparatus with the above-mentioned construction will hereinafter be described.

The RF signals are received by the antenna 10 and applied to the duplexer 11 which passes a desired frequency component thereof. The output signal from the duplexer 11 is amplified by the low-noise amplifier 12 and filtered by the band pass filter 13. The synthesizer 14 produces a local oscillating frequency using a phase locked loop (referred to hereinafter as PLL) and supplies the produced local oscillating frequency to the mixer 15 which is also applied with the output signal from the band pass filter 13. The mixer 15 mixes the output signal from the band pass filter 13 with the output signal from the synthesizer 14 to produce the IF signal. The mixer 15 then outputs the IF signal to the buffer 21. At this time, the central controller applies the A/B switching control signal s to the analog switch 22 to perform the switching operation.

First, the analog switch 22 operates responsive to the A/B switching control signal s from the central controller 20 to select the terminal A. As a result, the output signal from the buffer 21 is transferred to the terminal A by the analog switch 22. It is then checked whether the input signal at the terminal A is normal. If it is checked that the input signal at the terminal A is normal, the signal reception is continuously performed. If it is checked that the input signal at the terminal A is not normal, the analog switch 22 operates responsive to the A/B switching control signal s from the central controller 20 to select the terminal B. As a result, the output signal from the buffer 21 is transferred to the terminal B by the analog switch 22. Whenever the signal reception is performed, the above switching operation is repeated to selectively receive a digital or analog signal.

However, the above-mentioned conventional dual-bandwidth cellular telephone switching apparatus has a disadvantage in that the analog switch is relatively expensive, increasing the cost. Further, the analog switch cannot accurately perform the switching operation because of a loss in the signal transfer.

SUMMARY OF THE INVENTION

Therefore, the present invention has been made in view of the above problem, and it is an object of the present invention to provide a dual-bandwidth cellular telephone switching apparatus for automatically switching power to two different cellular telephone systems to provide services on the cellular telephone systems.

In accordance with the present invention, the above and other objects can be accomplished by a provision of a dual-bandwidth cellular telephone switching apparatus comprising a signal receiver, the signal receiver including an antenna for receiving radio frequency signals on a field corresponding to frequency bands of at least two different cellular telephone systems, a duplexer for passing a desired frequency band component of output signals from the antenna, a low-noise amplifier for amplifying a feeble signal from the duplexer, a band pass filter for passing a desired frequency band component of an output signal from the low-noise amplifier, a synthesizer for detecting a channel being presently serviced and a mixer for mixing an output signal from the band pass filter with an output signal from the synthesizer to produce an intermediate frequency signal, wherein the improvement comprises switching means including first and second switching circuits, the first and second switching circuits selectively switching power to the two different cellular telephone systems under control of a central controller to selectively transfer an output signal from the mixer in the signal receiver thereto.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
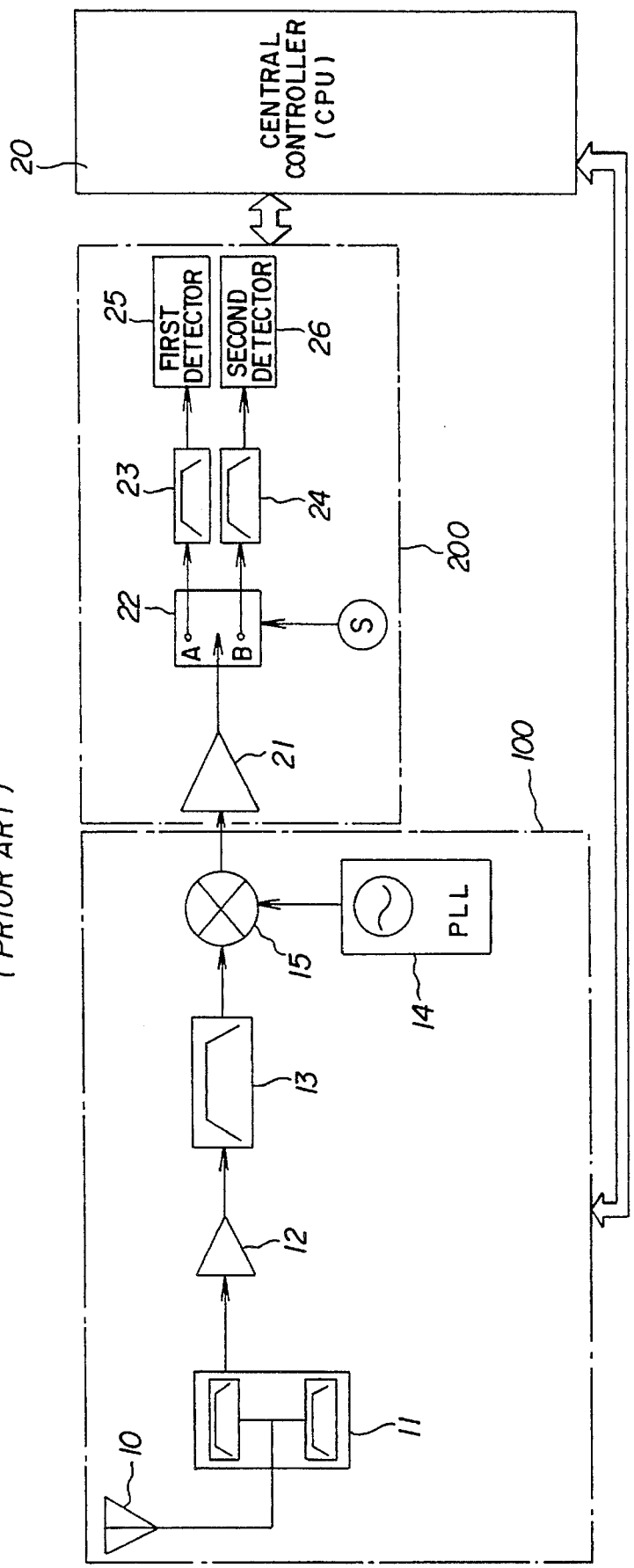
FIG. 1 is a circuit diagram of a conventional dual-bandwidth cellular telephone switching apparatus.
Figure 2:
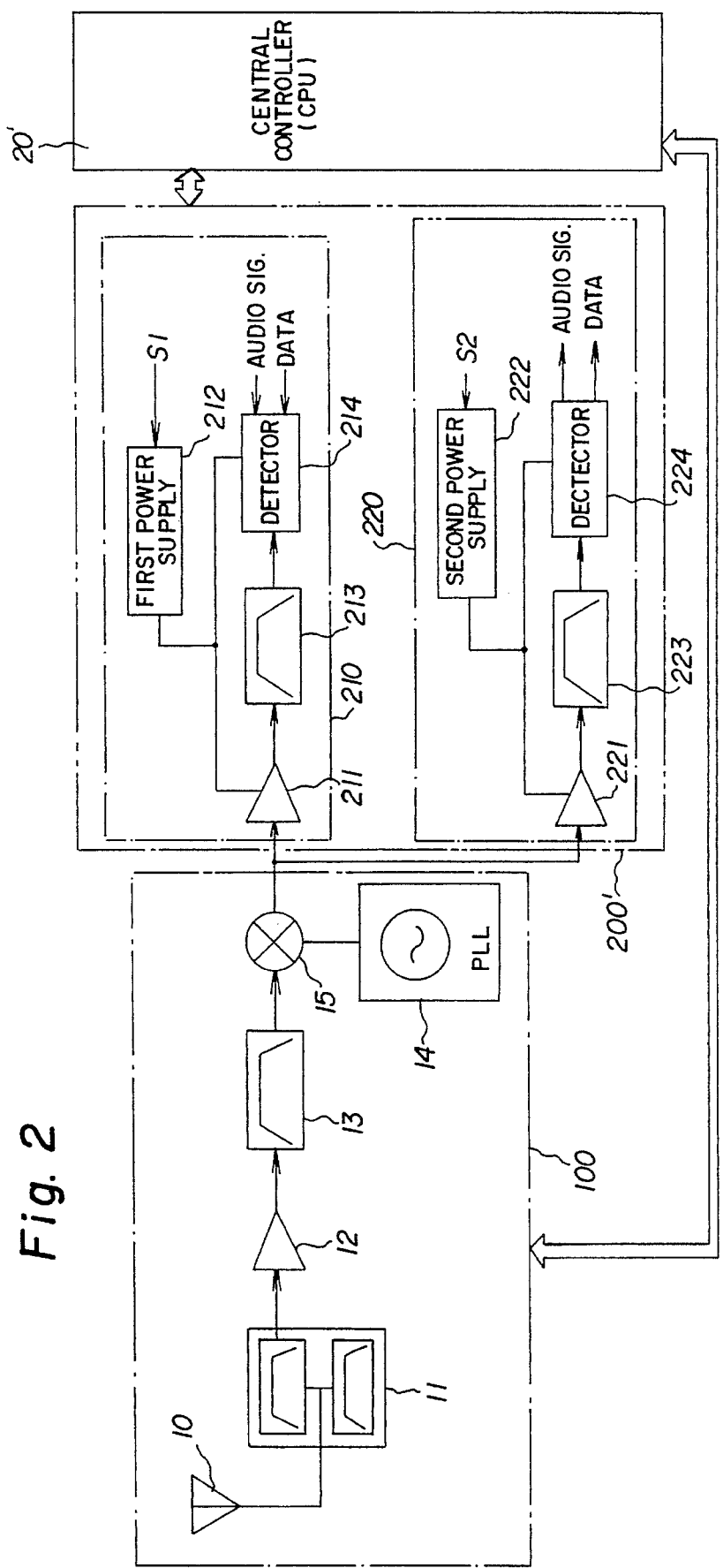
FIG. 2 is a circuit diagram of a dual-bandwidth cellular telephone switching apparatus in accordance with the present invention.

Referring to FIG. 2, there is shown a circuit diagram of a dual-bandwidth cellular telephone switching apparatus in accordance with the present invention. Some parts in this drawing are substantially the same as those in FIG. 1. Therefore, like reference numerals designate like parts.

As shown in FIG. 2, the dual-bandwidth cellular telephone switching apparatus comprises the signal receiver 100 including the antenna 10, the duplexer 11, the low-noise amplifier 12, the band pass filter 13, the synthesizer 14 and the mixer 15.

The antenna 10 receives the RF signals on the field corresponding to the frequency bands of the two different cellular telephone systems. The duplexer 11 passes a desired frequency band component of the output signals from the antenna 10. The low-noise amplifier 12 amplifies the feeble signal from the duplexer 11. The band pass filter 13 passes a desired frequency band component of the output signal from the low-noise amplifier 12. The synthesizer 14 detects a channel being presently serviced. The mixer 15 mixes the output signal from the band pass filter 13 with the output signal from the synthesizer 14 to produce the IF signal.

The dual-bandwidth cellular telephone switching apparatus further comprises a switching section 200' which includes first and second switching circuits 210 and 220 for selectively switching power to the two different cellular telephone systems under control of the central controller 20' to selectively transfer the output signal from the mixer 15 in the signal receiver 100 thereto.

The first switching circuit 210 includes a buffer 211 for buffering the output signal from the mixer 15 in the signal receiver 100, a first power supply 212 for supplying the power to the buffer 211 under the control of the central controller 20' when the cellular telephone is powered, an IF filter 213 for filtering an output signal from the buffer 211, and a detector 214 for detecting an output signal from the IF filter 213 to produce an audio signal and data.

The second switching circuit 220 includes a buffer 221 for buffering the output signal from the mixer 15 in the signal receiver 100, a second power supply 222 for supplying the power to the buffer 221 under the control of the central controller 20' when the cellular telephone is powered, an IF filter 223 for filtering an output signal from the buffer 221, and a detector 224 for detecting an output signal from the IF filter 223 to produce an audio signal and data.

The operation of the dual-bandwidth cellular telephone switching apparatus with the above-mentioned construction in accordance with the present invention will hereinafter be described in detail.

The RF signals are received by the antenna 10 and applied to the duplexer 11 which passes a desired frequency component thereof. The output signal from the duplexer 11 is amplified by the low-noise amplifier 12 and filtered by the band pass filter 13. The synthesizer 14 produces the local oscillating frequency using the PLL and supplies the produced local oscillating frequency to the mixer 15 which is also applied with the output signal from the band pass filter 13. The mixer 15 mixes the output signal from the band pass filter 13 with the output signal from the synthesizer 14 to produce the IF signal. The mixer 15 then outputs the IF signal to the buffers 211 and 221 in the first and second switching circuits 210 and 220. At this time, the central controller supplies the power to the first and second switching circuits 210 and 220 to perform the switching operation.

Upon powering the cellular telephone, the central controller 20' first drives the first switching circuit 210. Namely, the central controller applies a power ON/OFF control signal s1 to the first power supply 212 to supply the power to the buffer 211. As the buffer 211 is driven, the central controller 20' checks whether the received signal is normal. If the received signal is normal, the central controller performs the signal reception continuously. If the received signal is not normal, the central controller 20' then drives the second switching circuit 220.

The second switching circuit 220 is driven in the same manner as the first switching circuit 210. First, the central controller 20' applies the power ON/OFF control signal s1 to the first power supply 212 to interrupt the power to the buffer 211. The central controller 20' then applies a power ON/OFF control signal s2 to the second power supply 222 to supply the power to the buffer 221. As the buffer 221 is driven, the central controller 20' checks whether the received signal is normal. If the received signal is normal, the central controller 20' performs the signal reception continuously. If the received signal is not normal, the central controller 20' recognizes that the cellular telephone is beyond the service area. As a result of the recognition, the central controller 20' stops the signal reception.

As apparent from the above description, according to the present invention, the switching operation can automatically be performed with no user activation or no use of relatively expensive frequency switch, providing the convenience and reducing the cost. Further, no use of relatively expensive frequency switch results in a reduction in loss in the signal transfer. Moreover, power can selectively be supplied only to a desired stage in a portable telephone using a limited capacity of battery. This has the effect of reducing a current consumption amount.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dual-bandwidth cellular telephone switching apparatus comprising a signal receiver, said signal receiver including an antenna for receiving radio frequency signals on a field corresponding to frequency bands of at least two different cellular telephone systems, a duplexer for passing a desired frequency band component of output signals from said antenna, a low-noise amplifier for amplifying a feeble signal from said duplexer, a band pass filter for passing a desired frequency band component of an output signal from said low-noise amplifier, a synthesizer for detecting a channel being presently serviced and a mixer for mixing an output signal from said band pass filter with an output signal from said synthesizer to produce an intermediate frequency signal, wherein the improvement comprises:

switching means including first and second switching circuits, said first and second switching circuits selectively switching power to said two different cellular telephone systems under control of a central controller to selectively transfer an output signal from said mixer in said signal receiver thereto.

2. A dual-bandwidth cellular telephone switching apparatus as set forth in claim 1, wherein each of said first and second switching circuits includes:

a buffer for buffering the output signal from said mixer in said signal receiver;

a power supply for supplying the power to said buffer under the control of said central controller when a cellular telephone is powered;

an intermediate frequency filter for filtering an output signal from said buffer; and a detector for detecting an output signal from said intermediate frequency filter to produce an audio signal and data.

3. A dual-bandwidth cellular telephone switching apparatus as set forth in claim 2, wherein said central controller is performed to supply the power to said first switching circuit upon receiving the output signal from said mixer in said signal receiver, to check whether the received signal is normal, to perform the signal reception continuously if it is checked that the received signal is normal and, if it is checked that the received signal is not normal, interrupting the power to said first switching circuit and supplying the power to said second switching circuit, to check whether the received signal is normal and to perform the signal reception continuously if it is checked that the received signal is normal and, if it is checked that the received signal is not normal, recognizing that the cellular telephone is beyond a service area and stopping the signal reception.

\* \* \* \* \*